United States Patent
Turon

(10) Patent No.: US 10,849,016 B2
(45) Date of Patent: *Nov. 24, 2020

(54) PACKET SEGMENTATION AND REASSEMBLY FOR MESH NETWORKS

(71) Applicant: Google LLC, Mountain View, CA (US)

(72) Inventor: Martin A. Turon, Berkeley, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/423,795

(22) Filed: May 28, 2019

(65) Prior Publication Data

US 2019/0281496 A1    Sep. 12, 2019

Related U.S. Application Data

(63) Continuation of application No. 15/645,592, filed on Jul. 10, 2017, now Pat. No. 10,356,658.

(51) Int. Cl.

| | |
|---|---|
| H04L 9/00 | (2006.01) |
| H04L 1/00 | (2006.01) |
| H04W 80/00 | (2009.01) |
| H04W 88/00 | (2009.01) |
| H04W 28/06 | (2009.01) |
| H04L 1/16 | (2006.01) |
| H04L 1/18 | (2006.01) |

(Continued)

(52) U.S. Cl.
CPC ......... *H04W 28/065* (2013.01); *H04L 1/1614* (2013.01); *H04L 1/1628* (2013.01); *H04L 1/189* (2013.01); *H04L 1/1848* (2013.01); *H04W 12/1006* (2019.01); *H04W 4/80* (2018.02); *H04W 84/18* (2013.01)

(58) Field of Classification Search
CPC .. H04L 69/166; H04L 49/9057; H04L 69/161
USPC .................................................. 370/474, 476
See application file for complete search history.

(56) References Cited

U.S. PATENT DOCUMENTS

| | | | |
|---|---|---|---|
| 10,356,658 B2 | 7/2019 | Turon | |
| 2003/0084185 A1* | 5/2003 | Pinkerton | ............... H04L 29/06 709/236 |

(Continued)

OTHER PUBLICATIONS

"Non-Final Office Action", U.S. Appl. No. 15/645,592, dated Oct. 30, 2018, 23 pages.

(Continued)

*Primary Examiner* — Asad M Nawaz
*Assistant Examiner* — Jason A Harley
(74) *Attorney, Agent, or Firm* — Colby Nipper PLLC

(57) ABSTRACT

In aspects of packet segmentation and reassembly for mesh networks, a source node in a mesh network segments an access protocol data unit (PDU) into a set of segments that are concatenated with a segment transport header and transmitted over the mesh network in segmented access messages to a destination node. The destination node allocates memory to store the content of the access PDU based on a segment total field in the segment transport header, and stores each received segment at the appropriate offset in the allocated memory, based on a value of a segment offset filed in each segmented access message. The destination node transmits a segment acknowledgement message including a segment acknowledgement field indicating which of the multiple segments have been received by the destination node.

18 Claims, 8 Drawing Sheets

(51) Int. Cl.
*H04W 12/10* (2009.01)
*H04W 84/18* (2009.01)
*H04W 4/80* (2018.01)

(56) References Cited

U.S. PATENT DOCUMENTS

| | | | |
|---|---|---|---|
| 2005/0117526 A1* | 6/2005 | Melnik | H04L 45/34 370/254 |
| 2006/0133364 A1* | 6/2006 | Venkatsubra | H04L 47/10 370/389 |
| 2007/0230337 A1* | 10/2007 | Igarashi | H04L 1/188 370/230 |
| 2011/0141304 A1* | 6/2011 | Okamoto | G06K 9/00228 348/222.1 |
| 2013/0024541 A1* | 1/2013 | Ziegler | H04L 47/266 709/217 |
| 2014/0376466 A1* | 12/2014 | Jeong | H04W 74/0833 370/329 |
| 2015/0230121 A1 | 8/2015 | Diachina et al. | |
| 2017/0099567 A1 | 4/2017 | Kwon et al. | |
| 2017/0331715 A1 | 11/2017 | Jung et al. | |
| 2019/0014497 A1 | 1/2019 | Turon | |

OTHER PUBLICATIONS

"Notice of Allowance", U.S. Appl. No. 15/645,592, dated Mar. 13, 2019, 15 pages.

\* cited by examiner

300

| Network ID 302 | TTL 304 | SEQ 306 | SRC 308 | DST 310 | Transport Payload 312 | MICnet 314 |

| Network ID 302 | TTL 304 | SEQ 306 | SRC 308 | DST 310 | Transport Payload 312 | MICnet 314 |

| SarTID 402 | SegO 404 | SegN 406 | Segment 408 |

| Network ID 302 | TTL 304 | SEQ 306 | SRC 308 | DST 310 | Transport Payload 312 | MICnet 314 |

| SarTID 402 | SegACK 502 |

*Fig. 5*

PACKET SEGMENTATION AND REASSEMBLY FOR MESH NETWORKS

RELATED APPLICATION

This application is a continuation application of U.S. patent application Ser. No. 15/645,592, filed Jul. 10, 2017, the disclosure of which is incorporated herein by this reference.

BACKGROUND

Using wireless mesh networking to connect devices to each other, and to cloud-based services, is increasingly popular for sensing environmental conditions, controlling equipment, and providing information and alerts to users. Radio regulatory regimes and resource constraints in low-power mesh networks and devices limit the payload size of data packets that are communicated in the mesh network. Some mesh network applications may require larger payloads than can be transmitted in a single data packet. Many devices on mesh networks are designed to operate for extended periods of time on battery power, which limits the available computing, user interface, and radio resources in the devices. Increasing the size of data packets leads to transmitting larger packets over the mesh network, which increases power consumption, the use of computing and memory resources, increases the probability of packet collisions, and reduces network capacity.

While each application running on a mesh network could be designed to perform segmentation and reassembly of data packets at an application level, this would burden each application developer with creating a custom solution for segmentation, as well as considering the security, efficiency, and reliability of segmenting and reassembling data packet payloads.

SUMMARY

This summary is provided to introduce simplified concepts of packet segmentation and reassembly for mesh networks, generally related to addressing and routing. The simplified concepts are further described below in the Detailed Description. This summary is not intended to identify essential features of the claimed subject matter, nor is it intended for use in determining the scope of the claimed subject matter.

Packet segmentation and reassembly for mesh networks, generally related to transporting application payloads in size-constrained data packets in a mesh network, is described. In aspects, a source node segments an access protocol data unit (PDU) into a set of multiple segments, and concatenates a segment transport header to each segment of the multiple segments to form a set of transport payloads. The source node inserts each transport payload into a segmented access message and transmits the segmented access messages to a destination node.

Packet segmentation and reassembly for mesh networks, generally related to transporting application payloads in size-constrained data packets in a mesh network, is described. In aspects, a mesh network device of a mesh network is implemented as a destination node, which receives segmented access messages that each comprise a segment transport header and a segment from a set of multiple segments derived from an access protocol data unit (PDU). The segment transport header includes a segmentation and reassembly transaction identifier (SarTID) field, a segment offset (SegO) field, and a segment total (SegN) field. If a received segmented access message is the first segmented access message received with a specific SarTID, the destination node allocates a segment of the memory that is the length indicated by a length value of the SegN field, stores the received segment in the allocated memory at an offset equal to an offset value indicated by the SegO field, and transmits a segment acknowledgement message including a segment acknowledgement (SegACK) field that indicates which segments in the set of multiple segments were received by the destination node.

Packet segmentation and reassembly for mesh networks, generally related to transporting application payloads in size-constrained data packets in a mesh network, is described. In aspects, a system is described that includes a source mesh network device that segments and access PDU into multiple segments, concatenates a segment transport header to each of the segments to form a set of transport payloads that the source mesh network device inserts into segmented access messages, and transmit the network layer message, via a mesh network, to a destination mesh network device.

BRIEF DESCRIPTION OF THE DRAWINGS

Aspects of packet segmentation and reassembly for mesh networks are described with reference to the following drawings. The same numbers are used throughout the drawings to reference like features and components:

FIG. 3 illustrates an example mesh network packet for various aspects of packet segmentation and reassembly for mesh networks.

FIG. 4 illustrates an example segmented access message for various aspects of packet segmentation and reassembly for mesh networks.

FIG. 5 illustrates an example segment acknowledgement message for various aspects of packet segmentation and reassembly for mesh networks.

DETAILED DESCRIPTION

Figure 1:
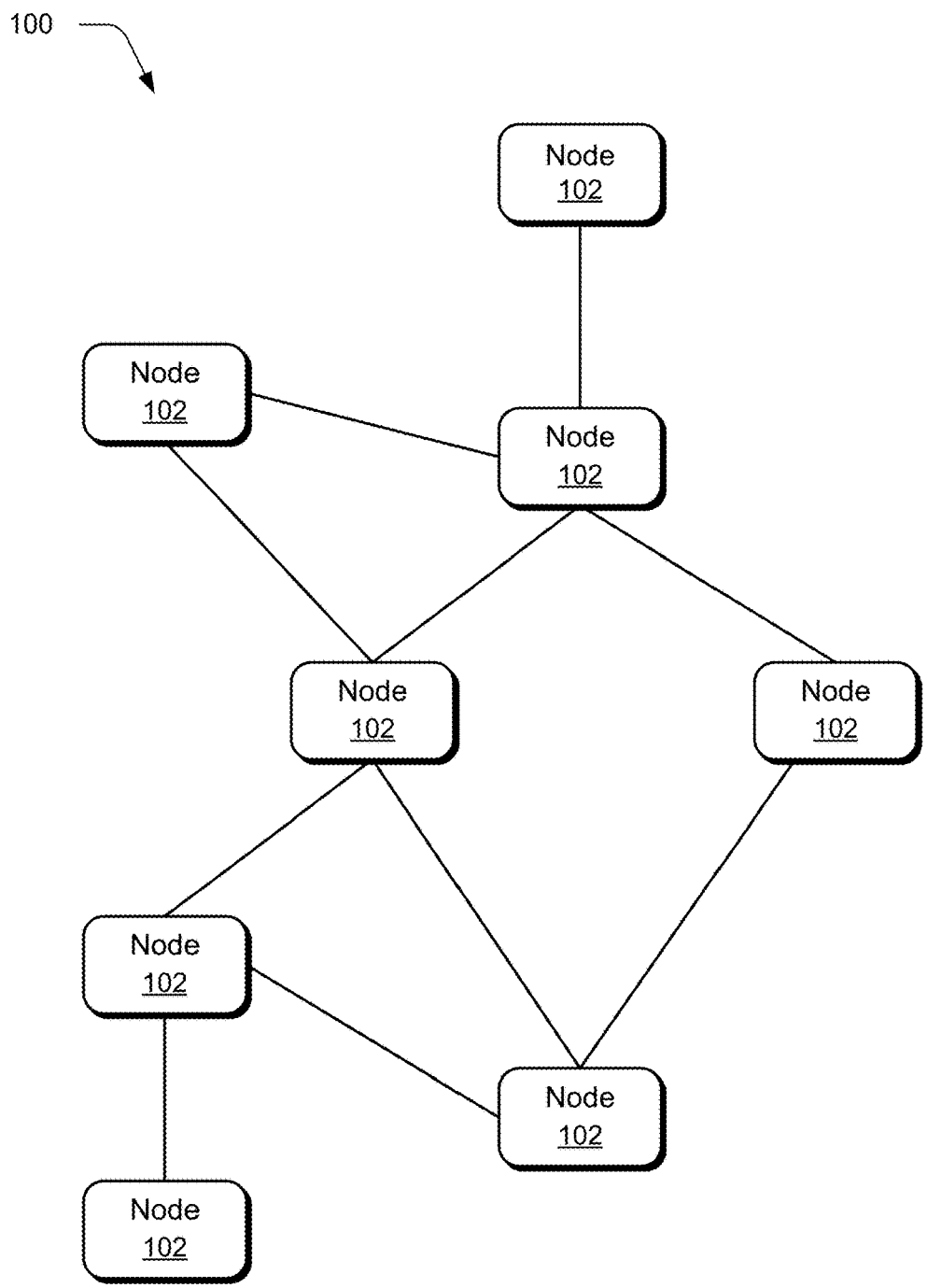
FIG. 1 illustrates an example mesh network system in which various aspects of packet segmentation and reassembly for mesh networks can be implemented.

Wireless mesh networks are communication networks having wireless nodes connected in a mesh topology that provides reliable and redundant communication paths for traffic within the mesh network. Wireless mesh networks use multiple radio links, or hops, to forward traffic between devices within the mesh network. This provides coverage for areas larger than the area covered by a single radio link.

Wireless mesh networks can be based on proprietary technologies, or standards-based technologies. For example, wireless mesh networks may be based on the IEEE 802.15.4 standard, which defines physical (PHY) layer and Media Access Control (MAC) layer features and services for use by applications at higher layers of a mesh networking stack. Upper-layer applications rely on these standards-defined services to support addressing and routing of packet data to support application-level communication across a mesh network and between the mesh network and external networks.

Similarly other wireless mesh network technologies, such as Bluetooth®, Thread ZigBee Z-Wave Bluetooth® Low Energy (BLE), Bluetooth Smart, and Bluetooth Mesh have similar layered networking stacks. For example, Bluetooth defines an access layer, a transport layer, a network layer, and a bearer layer. The bearer layer defines how network messages are transported between nodes of the mesh network. The network layer defines how messages are addressed to mesh network nodes, defines the network message format that is transported by the bearer layer, and defines how the application payload is included with the network message. The transport layer defines the format of the application payload and how the application payload is encrypted and authenticated. The access layer defines how applications use the transport layer and defines the operations and behavior of applications.

Many of these low-power radio protocols may have limited packet sizes due to the constraints of their operating requirements, such as battery life, processor and memory resources, and so forth. Additionally, wireless mesh networks may operate in relatively lossy radio environments and transmitted packets may be lost due to collisions, noise, or interference. In these lossy environments, mechanisms for acknowledgment and retransmission of segments of an application payload are needed to provide reliable delivery of packets.

In addition to the need for reliable delivery, efficiency of communication is also needed to minimize the amount of mesh network traffic used to deliver and acknowledge the receipt of segmented messages. For example, when flooding and relaying is used to transmit segmented messages, it is important to minimize acknowledgment traffic which may interfere with the transmission of successive segments of an application payload.

One alternative approach to acknowledging segmented application payloads is to send all segments of an application payload to a destination node and then the destination node sends a singular acknowledgment message after all the segments have been received. However, if only a portion of the segments are received at the destination, this approach causes all segments to be retransmitted until the singular acknowledgment is received at the source node, indicating that all the segments have been received at the destination. This approach is overly redundant and inefficient in a lossy environment, because some packets that have been received will be retransmitted unnecessarily.

Another alternative approach is to acknowledge the receipt of each segment of an application payload. However, this approach creates a large amount of acknowledgment traffic in the mesh network which increases the probability of packet collisions and reduces network efficiency.

In another approach each segment can be repetitively transmitted until an acknowledgment for that individual segment is received. Then, the sending node moves on to the next segment and repeats this process. Again, this approach becomes inefficient, delays the receipt of the entire application payload, and creates traffic that reduces network efficiency.

In yet another approach, individual segments can be repetitively transmitted in a round-robin manner. The round-robin transmission continues until the sending node receives a final acknowledgement that indicates that the entire message has been received. This approach is also inefficient due to extra retransmissions of segments that have already been successfully received.

With any of the alternative approaches described, the receiving node may only know about a current segment and may not have knowledge about the length of the entire reassembled application payload. This causes the receiving node to dynamically allocate buffer memory as each segment arrives or allocate a memory buffer that is sized to hold the maximum-allowable, reassembled application payload before reassembling the segments to pass to higher layers of the network stack.

In one aspect of packet segmentation and reassembly for mesh networks, each network layer message that carries segmented data also includes a transaction identifier that is unique to a set of segments that make up the application payload that is being segmented, transmitted, reassembled, and acknowledged. Each network layer message also includes an indication of the number of segments associated with the transaction identifier and an indication of the offset of the segment in the reassembled application payload.

When the receiving node receives any segment associated with the transaction identifier, even if segments are received out of order, the receiving node is able to allocate only the amount of memory required to store the reassembled access payload, based on knowing the number of segments associated with the transaction identifier. Further, the receiving node can directly place each received segment at the appropriate offset in the allocated memory without requiring any further allocation of memory as an intermediate buffer to hold the segmented data as it is received. This process allows the receiving node, with limited computing resources, to efficiently process and reassemble segmented data using a minimal amount of computing and memory, regardless of the order in which segments are received or which segment of the message is received first. Each network layer message that carries a segment also includes network layer authentication to validate each segment individually as the segment is received.

In one aspect of packet segmentation and reassembly for mesh networks a bulk acknowledgment is used to acknowledge the receipt of multiple segments in a single message. An acknowledgment message includes a segment acknowledgment bit field, in which each bit represents one segment and indicates whether the segment has or has not been received. The transmission of the acknowledgment message is performed periodically, as described in detail below, so that a limited number of acknowledgment messages are transmitted to reduce the amount of acknowledgment traffic across the mesh network, and to further reduce traffic at the sending node by limiting retransmission to retransmission of dropped segments. This approach reduces packet collisions and improves efficiency in networks with small frame formats that transmit packets by flooding and relaying packets at the bearer layer.

While features and concepts of the described systems and methods for packet segmentation and reassembly for mesh networks can be implemented in any number of different environments, systems, devices, and/or various configurations, aspects of packet segmentation and reassembly for mesh networks are described in the context of the following example devices, systems, and configurations.

FIG. 1 illustrates an example mesh network system 100 in which various aspects of packet segmentation and reassembly for mesh networks can be implemented. The mesh network 100 is a wireless mesh network that includes nodes 102. The nodes 102 are mesh network devices, as described below with respect to FIG. 10, which include a mesh network interface for communication over the mesh network 100. The nodes 102 receive and transmit packet data over the mesh network interface. The nodes 102 also route, forward, and/or relay packets across the mesh network 100.

Figure 2:
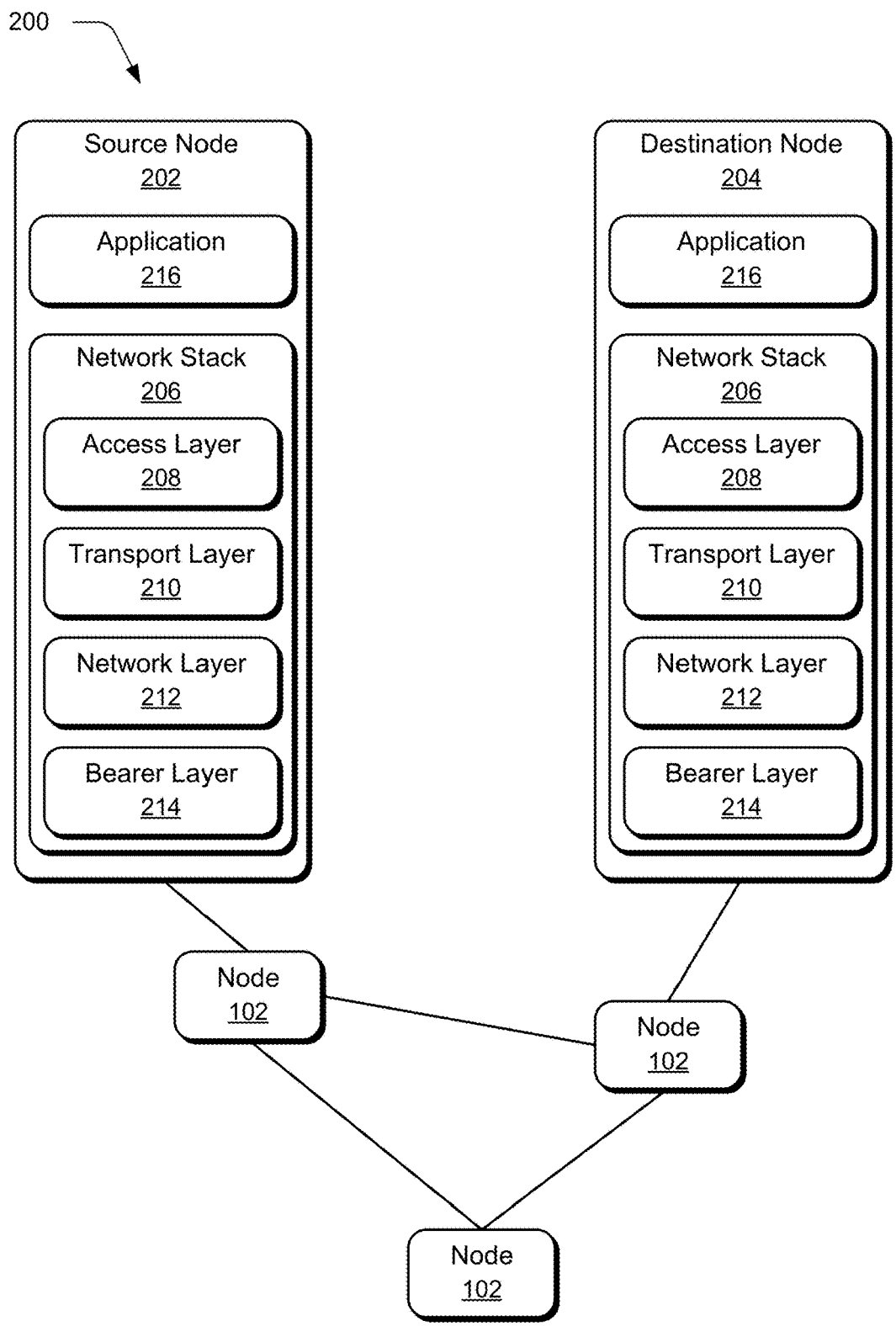
FIG. 2 illustrates an example environment in which various aspects of packet segmentation and reassembly for mesh networks can be implemented.

FIG. 2 illustrates an example environment 200 in which various aspects of packet segmentation and reassembly for mesh networks can be implemented. The environment 200 includes selected nodes 102 from the mesh network 100 to illustrate techniques of packet segmentation and reassembly for mesh networks in greater detail.

Environment 200 illustrates two nodes 102 of the mesh network 100, as a source node 202, and a destination node 204. The source node 202 and the destination node 204 are shown as including a network stack 206 that is included in all of the nodes 102. The network stack 206 includes an access layer 208, a transport layer 210, a network layer 212, and a bearer layer 214. The network stack 206 is shown in this example with four layers, but as is well known, the network stack 206 may alternatively have fewer or more layers. The operations described with respect to specific layers below may alternatively be performed at other layers, partitioned between multiple layers, or combined from multiple layers to a single layer.

The source node 202 and the destination node 204 include one or more applications 216 that use the network stack 206 to communicate over the mesh network 100. The application 216 is a logical grouping of related functions, which may also described as a model, a profile, a cluster, and so forth. By way of example and not limitation, the application 216 in the source node 202 is a sensor application that manages functions of reading a sensor, processing the data read from the sensor, and publishing sensor readings.

The application 216, in the source node 202, publishes the sensor reading by passing application data that will be included in a mesh network packet to the access layer 208 of the network stack 206. The access layer 208 defines how the application 216 uses the transport layer 210. The access layer 208 passes the application data and configuration information to the transport layer 210. The transport layer 210 defines how the application payload is encrypted and authenticated, as described in greater detail below.

The transport layer 210 sends the application payload to the network layer 212. The network layer 212 determines how the mesh network packet is addressed and how the application payload is included in the mesh network packet. The network layer 212 forms a destination address (DST) that is inserted into the DST field of the packet. The network layer 212 sends the mesh network packet, including the destination address and the application payload, to the bearer layer 214. The bearer layer 214 transmits the mesh network packet over the mesh network 100.

The destination node 204 receives the mesh network packet from the mesh network 100 at the bearer layer 214. The bearer layer 214 passes the received mesh network packet to the network layer 212. The network layer 212 determines that the destination address is the address of the destination node 204. The network layer 212 then sends the application payload from the packet to the transport layer 210. The transport layer 210 performs the authentication process on the application payload. After confirming the authenticity and the validity of the application payload, the transport layer 210 sends the application payload to the application 216 at the access layer 208 in the destination node 204.

FIG. 3 illustrates an example mesh network packet 300 for various aspects of packet segmentation and reassembly for mesh networks techniques. The example packet 300 includes a number of fields, the contents of which are determined by the various layers of the network stack 206. The example packet 300 may be any type of wireless communication packet, such as a BLE advertisement packet, a ZigBee packet, an IEEE 802.15.4 packet, a Bluetooth Mesh packet, and so forth. The various fields in the packet 300 are shown for illustrative purposes and may vary in length and/or location within the packet 300.

A network identifier (Network ID) 302 may include various information added to the packet 300 by the bearer layer 214 and/or network layer 212. The network identifier 302 field may include synchronization information, such as a preamble and/or training sequence, a network identifier value, a packet priority, a network initialization vector, and so forth.

A Time-To-Live (TTL) 304 field includes a value that indicates the number of times the packet 300 may be forwarded across the mesh network 100. A sequence number (SEQ) 306 field includes a value that is incremented in the network layer 212 for every packet transmitted by each node 102. A receiving node 102 uses the sequence number 306 to reorder the packets 300 that are received out of order at the receiving node 102. The SEQ 306 is also used in the generation of nonce values that are used for replay protection and security purposes in the mesh network 100. A source address (SRC) 308 field includes the address of the source node 102 of the packet 300.

A destination address (DST) 310 field includes the destination address for the packet 300. The destination address 310 may include any one of a number of different address types, such as a local address, a device address, a group address, a virtual address, a unicast address, a multicast address, a broadcast address, and so forth.

The network identifier 302, the TTL 304, the SEQ 306, the SRC 308 and the DST 310 fields may be collectively referred to as the header (or packet header) of the packet 300. The packet header may include other fields as defined by any particular networking technology.

A transport payload 312 includes data defined by an application 216 at the access layer 208. The transport payload 312 may be encrypted using any suitable encryption techniques, such as Advanced Encryption Standard Counter with CBC-MAC (AES-CCM). A network message integrity check ($MIC_{net}$) 314 authenticates the destination address 310. The $MIC_{net}$ 314 is generated using any suitable hashing technique, such as AES-CCM.

FIG. 4 illustrates an example segmented access message 400 for various aspects of packet segmentation and reassembly for mesh networks. The example segmented access message 400 illustrates the data packet 300 as used to transport segmented access PDUs. In the segmented access message 400, the fields in the transport payload 312 include a Segmentation and Reassembly Transaction Identifier (SarTID) 402, a Segment Offset (SegO) 404, a Segment Total (SegN) 406, and a segment 408. The SarTID 402 is a unique identifier associated with each unique access PDU that is transmitted using multiple segments 408. The value in the SarTID 402 field, in each segmented access message 400, which transmits a portion of the same access PDU, includes the same value in the SarTID 402 field. The value in the SarTID 402 field is unique to the set of segments that are transmitted for a single frame of access PDU.

The SegO 404 field contains a value that indicates the offset of the segment 408 within the access PDU. For example, if n segments 408 are required to transport an access PDU, the value of SegO is 0 for the first segment 408, 1 for the second segment 408 . . . and n−1 for the nth segment 408. The size of the SegO 404 field may any suitable length. By way of example, and not limitation, the SegO field 404 is five bits long, which allows for 32 segments to be used to transport an access PDU.

The SegN 406 field contains the total number of segments 408 used to transport the access PDU associated with the SarTID 402. The size of the SegN 406 field may any suitable length. By way of example, and not limitation, the SegN field 408 is five bits long, which allows for 32 segments to be used to transport an application payload. In a Bluetooth Mesh system that supports 12 byte segments, an access PDU of 384 bytes can be transported with a five-bit SegN field length.

FIG. 5 illustrates an example segment acknowledgement message 500 for various aspects of packet segmentation and reassembly for mesh networks. The example segment acknowledgement message 500 illustrates the data packet 300 as used to acknowledge the receipt of access PDU segments. In the segment acknowledgement message 500, the fields in the transport payload 312 include the SarTID 402 field, and a Segment Acknowledge (SegACK) 502 field. The SegACK 502 field includes a bit field in which each bit corresponds to one of the segments 408 used to transport the access PDU. For each expected segment 408 that is received at the destination node 204, the corresponding bit value is set to one to indicate that the segment 408 was received. For each expected segment 408 that is not received the corresponding bit value is set to zero to indicate that the segment 408 has not been received. If fewer segments 408 than the maximum value of SegN 406 are expected, the bits associated with unused segment numbers are set to 1. The length of the SegACK 502 field is equal to $2^{segN}$. By way of example, and not limitation, the SegACK field 502 is 32 bits long, when the SegN 406 field is 5 bits long.

Figure 6:
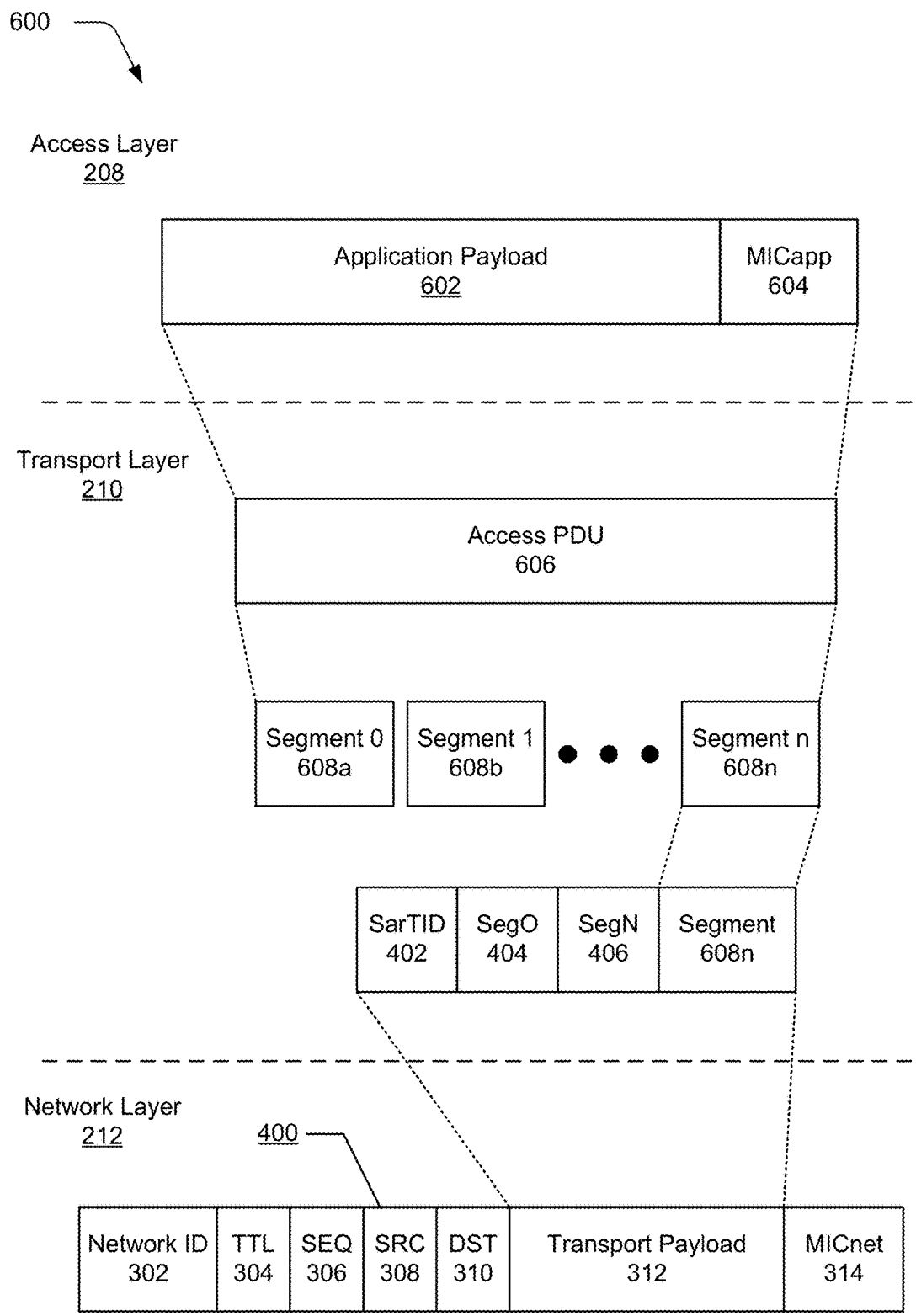
FIG. 6 illustrates an example of segmentation of an application payload at various layers of a network stack for various aspects of packet segmentation and reassembly for mesh networks in accordance with aspects of the techniques described herein.

FIG. 6 illustrates an example of segmentation of an application payload at various layers of the network stack 206. A protocol data unit (PDU) at the access layer 208 includes an application payload 602 and an application message integrity check (MIC$_{app}$) 604. The application payload 602 contains encrypted data from the application 216 and the MIC$_{app}$ 604 authenticates the application payload 602.

The application payload 602 and the MIC$_{app}$ 604 are passed from the access layer 208 to the transport layer 210 as an access protocol data unit (PDU) 606. The transport layer 210 segments the access PDU 606 into the number of segments 408 required to segment the entire access PDU 606. The set of segments 408 are illustrated as segments 608a, 608b . . . 608n. The transport layer 210 concatenates a transport segment header, which comprises the SarTID 402 field, the SegO 404 field, and the SegN 406 field, to each segment 608. For clarity of illustration this concatenation is only shown for the segment 608n, but this concatenation is done for each segment 608. The transport layer 210 passes the concatenated transport segment head and the associated segment 608 to the network layer 212, as the transport payload 312, for inclusion in the segmented access message 400 for transmission.

When the destination node 204 receives a network layer message that includes any segment 408, the destination node 204 uses the value in the SarTID field 402 to identify if this segment 408 is the first segment associated with a specific access PDU 602 or if this segment 408 is part of an access PDU 602 that the destination node 204 has already begun to reassemble. The first segment 408 associated with the specific access PDU 602, which is received at the destination node 204, can be any segment of the access PDU 602. In the case where the destination node 204 identifies that this is the first segment 408 received for a specific SarTID 402 value, the destination node 204 uses the value of the SegN 406 to allocate a segment of memory to store the reassembled access PDU 606.

Once the destination node 204 has allocated memory for the access PDU 606 that is to be reassembled, the destination node 204 uses the value in the SegO 404 field to determine the offset in the allocated memory, where the segment 408 is to be stored and stores the segment 408 in the allocated memory at that offset. By using this offset value, the destination node 204 can correctly and directly store each segment 408 in memory, as each segment 408 is received, regardless of ordering of the received segments 408, whether some segments 408 are not received, and without the allocation of additional buffer memory.

In the case where the destination node 204 identifies that a received segment 408 is the first segment 408 received for a specific SarTID 402 value, the destination node 204 initializes the SegACK 502 field. The destination node 204 initializes the value of each bit that corresponds to an expected segment to a value of zero and initializes any remaining bits to a value of one. For each received segment 408, the destination node 204 sets the corresponding bit in the SegACK 502 field to a value of one to indicate that this segment 408 has been received.

When the destination node 204 receives any segment 408 of an access PDU 602 as the first segment associated with a specific SarTID value, the destination node 204 initializes an acknowledgment timer. When the acknowledgment timer expires, the destination node 204 transmits the acknowledgment message 500 to the source node 202, indicating which segments have been received at the destination node 204, and if additional segments 408 are expected, the destination node reinitializes the acknowledgement timer. The destination node 204 may initialize the acknowledgment timer in any suitable way. By way of example and not limitation, the destination node 204 may use a fixed timeout value or may calculate the timeout value as a function of the values of one or more of the SegO 404, the SegN 406, and/or the TTL 304. The destination node 204 may use SegO/SegN of the first received segment 408 for the acknowledgement timer, base the acknowledgment timer on adding a fixed amount of time to the product of an additional time value times the value of the TTL 304 field, such as 150+(50*TTL) milliseconds, and so forth.

When the source node 202 receives the acknowledgment message 500, the source node evaluates the SarTID 402 field and the SegACK 502 field to determine which segments 408 have been received by the destination node 204 and which, if any segments 408 to retransmit to the destination node 204. The cycle of transmitting segments 408 in the segmented access messages 400 and receiving segment acknowledgement messages 500 at the source node 202 continues until the source node 202 receives a segment acknowledgement message 500 with the SegACK 502 field indicating that all the segments 408 associated with the SarTID 402 have been received at the destination node 204 or the source node 202 determines that a timeout for a maximum time to attempt to send the segmented message has been exceeded.

Example methods 700 and 800 are described with reference to respective FIGS. 7 and 8 in accordance with one or more aspects of packet segmentation and reassembly for mesh networks. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
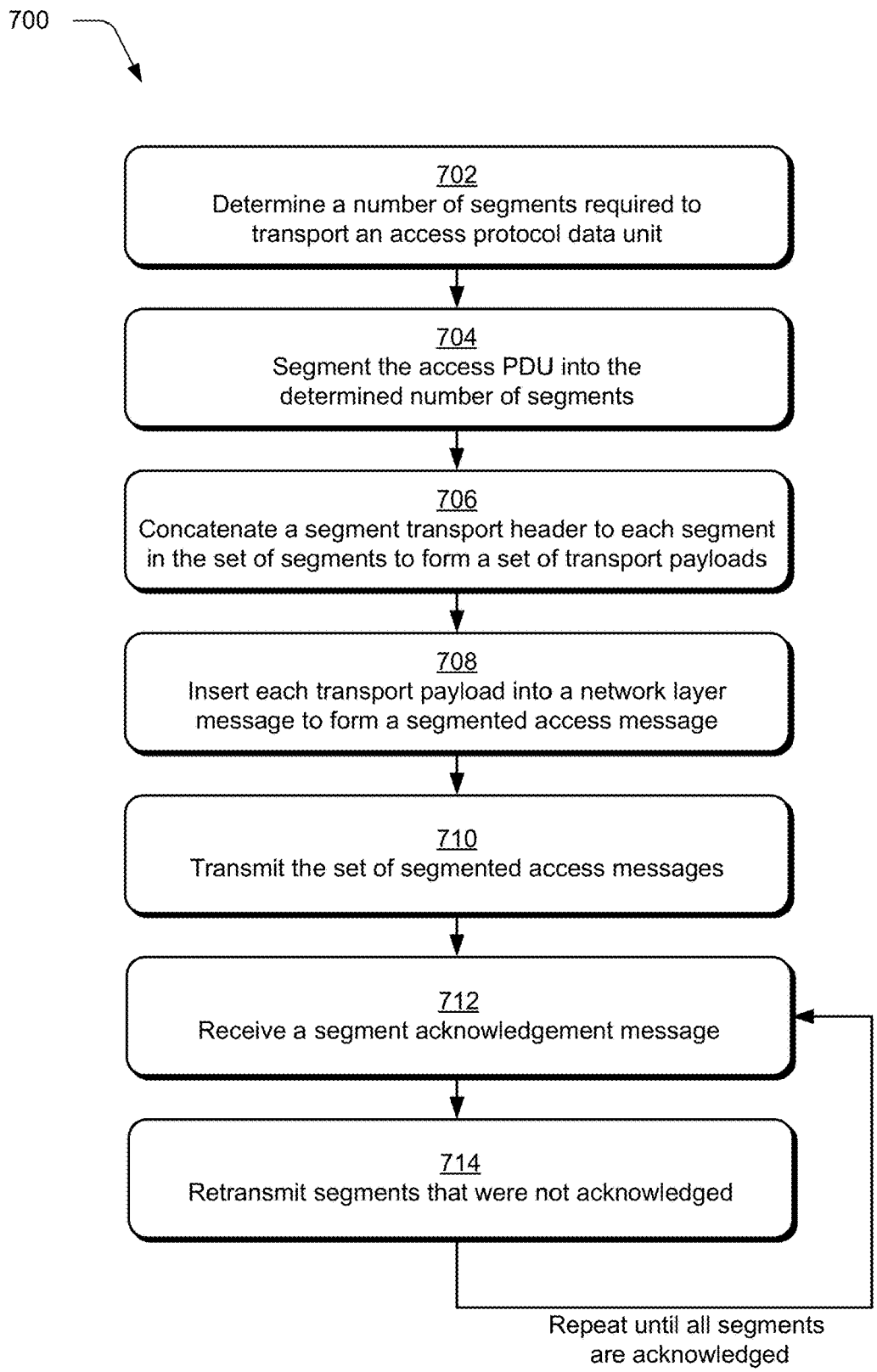
FIG. 7 an example method of packet segmentation and reassembly for mesh networks in accordance with aspects of the techniques described herein.

FIG. 7 illustrates example method(s) 700 of packet segmentation and reassembly for mesh networks. The order in which the method blocks are described are not intended to be construed as a limitation, and any number of the described method blocks can be combined in any order to implement a method, or an alternate method.

At block 702, a source node determines a number of segments required to transport an access PDU using segmented access messages of a wireless mesh network. For example, a source node 202 of the mesh network 100 determines the length of an access PDU 606 and determines a number of segments 408 that are required to transport the access PDU 606 across the mesh network 100 to a destination node 204.

At block 704, the source node divides the content of the access PDU into the determined number of segments. For example, the source node 202 splits the content of the access PDU 606 into a set of segments 408.

At block 706, the source node concatenates a segment transport header to each of the segments. For example, the source node 202 concatenates a segment transport header, which includes a segmentation and reassembly transaction identifier (SarTID) 402 field, a segment offset (SegO) 404 field, and a segment total (SegN) 406 field, to each segment 408 in the set of segments 408 to form a set of transport payloads 312.

At block 708, the source node inserts each transport payload into a network layer message to form a segmented access message. For example, the source node 202 inserts each transport payload 312 into a segmented access message 400.

At block 710, the source node transmits each segmented access message. For example, the source node 202 transmits each of the segmented access messages 400 over the mesh network 100 to the destination node 204.

At block 712, the source node receives a segment acknowledgement message indicating which segments have been received by the destination node. For example, the source node 202 receives a segment acknowledgement message 500 from the destination node 204 that includes a SegACK 502 field, which indicates which transmitted segments 408 have been received at the destination node 204.

At block 714, the source node retransmits segmented access messages for any segments that were not acknowledged in the segment acknowledgement message. The source node repeats retransmissions until all segments in the set of segments for the SarTID are acknowledged. For example, the source node 202 retransmits each of the segmented access messages 400 that were not acknowledged in the segment acknowledgement message 500 from the destination node 204. The source node 202 repeats receiving segment acknowledgement messages 500 and retransmitting segmented access messages 400 until all the segments 408 are acknowledged as being received at the destination node 204.

Figure 8:
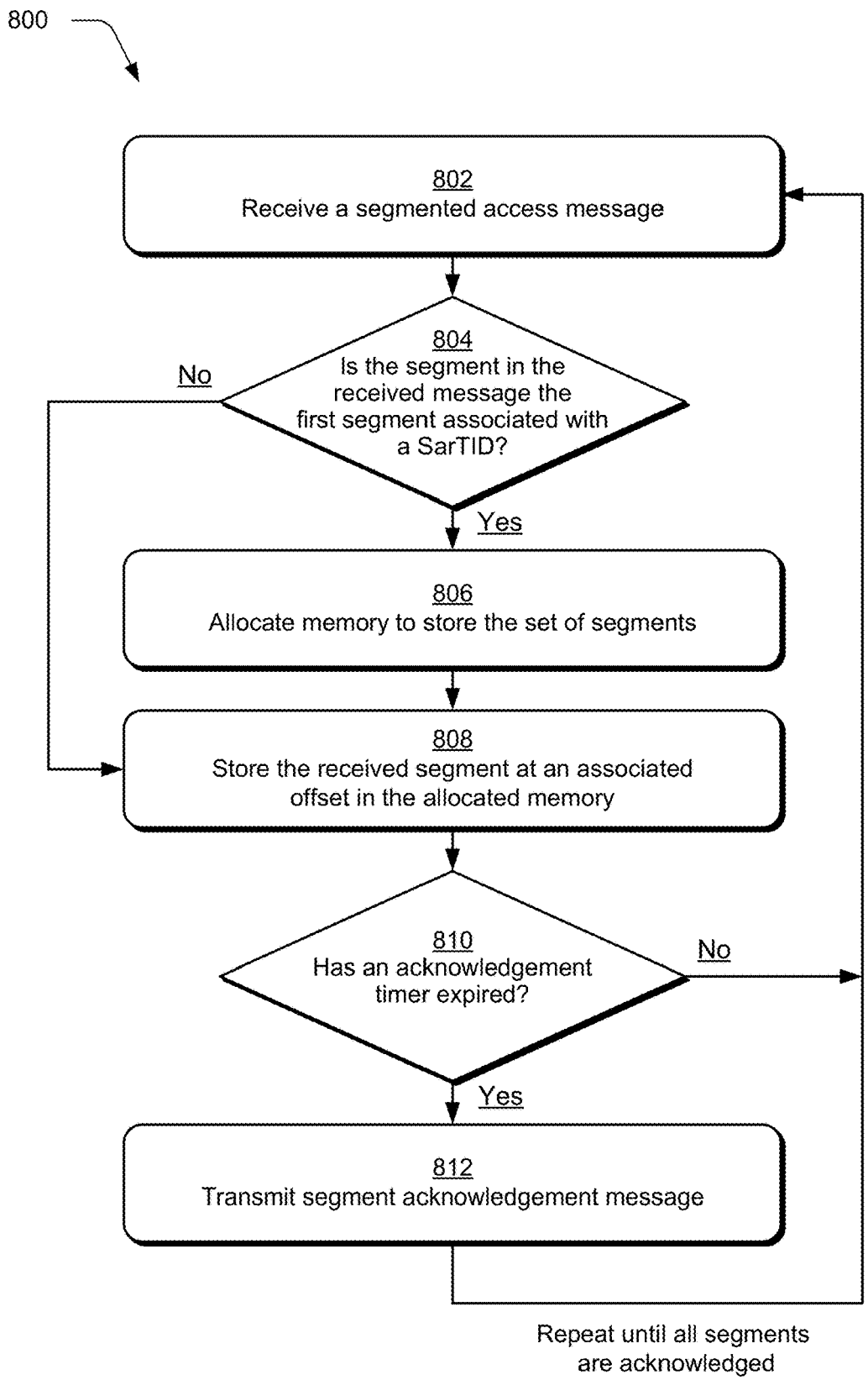
FIG. 8 illustrates another example method of packet segmentation and reassembly for mesh networks in accordance with aspects of the techniques described herein.

FIG. 8 illustrates example method(s) 800 of packet segmentation and reassembly for mesh networks. The order in which the method blocks are described are not intended to be construed as a limitation, and any number of the described method blocks can be combined in any order to implement a method, or an alternate method.

At block 802, a node receives a segmented access message over via a mesh network. For example, a destination node 204 receives a segmented access message 400 over the mesh network 100.

At block 804, the node determines from a SarTID in a segment transport header of the segmented access message, if a segment received in the message is the first segment received for the SarTID, and at 806 if the received segment is the first segment for the SarTID, the node allocates memory to store all the segments of an access PDU associated with the SarTID. For example, the destination node 204 determines if the segmented access message 400 is the first received segmented access message 400 that includes a value in a SarTID 402 field. If the segmented access message 400 is the first received segmented access message 400 that includes the value in the SarTID 402 field, the destination node allocates memory to store the segmented access PDU 606 using a length value in a SegN 406 field to determine the amount of memory to allocate for the reassembled access PDU 606.

At block 808, the node stores the segment from the segmented access message at an offset in the allocated memory based on an offset value included in the transport header. For example, the destination node 204 determines an offset in the allocated memory based on an offset value in a SegO 404 field included in the segmented access message 400 and stores the segment 408 from the segmented access message 400 at the offset that equals the offset value.

At block 810, the node determines if an acknowledgement timer has expired. If the acknowledgement timer has not expired the node waits to receive the remaining segments associated with the SarTID, or if the acknowledgement timer has expired, at block 812 the node transmits a segment acknowledge message. For example, the destination node 204 determines an acknowledgement timer has expired. If the acknowledgement timer has not expired, the destination node 204 waits to receive additional segmented access messages 400 associated with the SarTID. If the acknowledgement time has expired, the destination node 204 sets bit filed values in a SegACK 502 field to indicate which segments 408 for the SarTID 402 have been received and transmits the SegACK 502 field in a segment acknowledgement message 500 to the source node 202. If there are remaining, expected segments 408, the destination node 204 reinitializes the acknowledgement timer.

Figure 9:
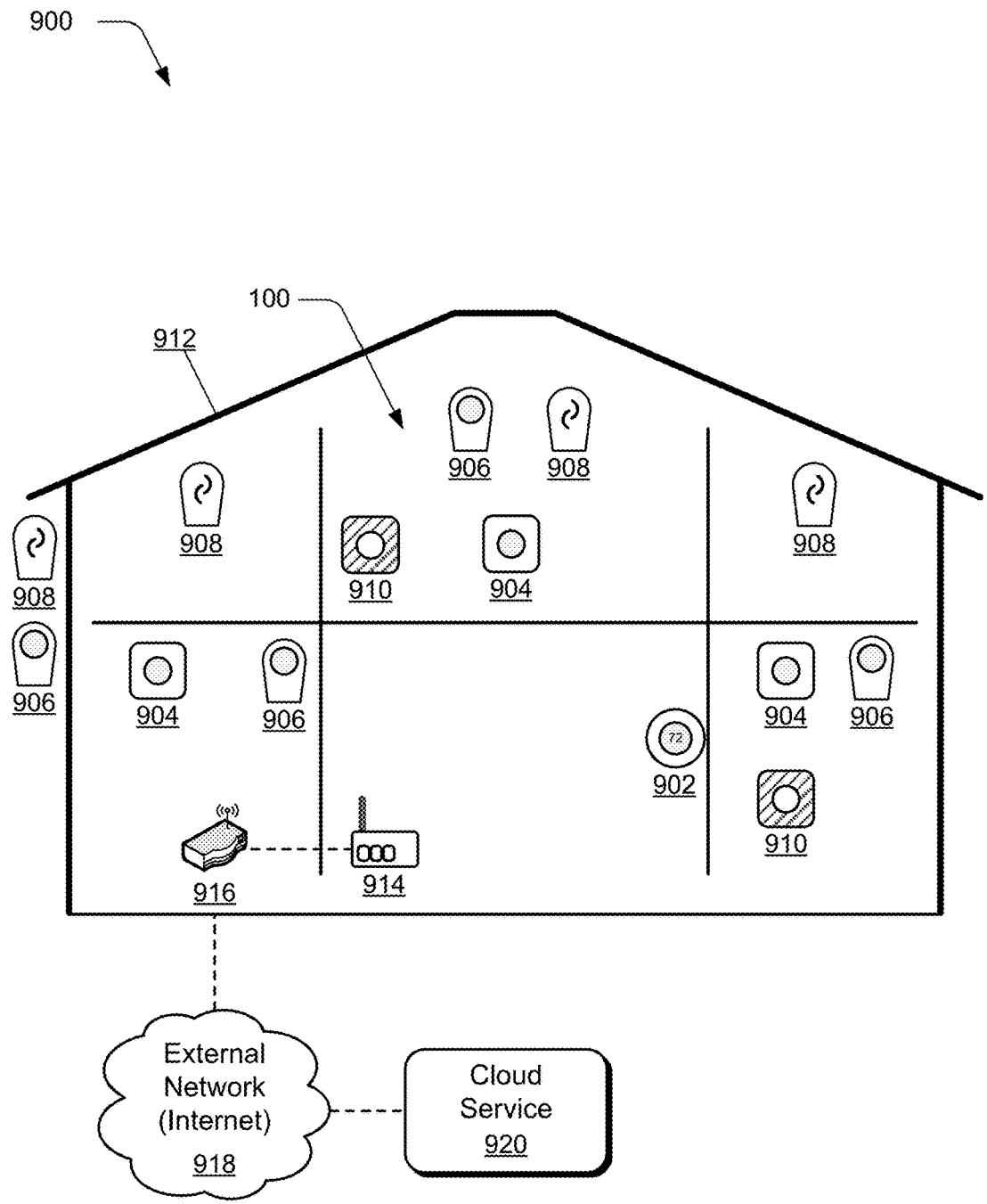
FIG. 9 illustrates an example environment in which a mesh network can be implemented in accordance with aspects of the techniques described herein.

FIG. 9 illustrates an example environment 900 in which the mesh network 100 (as described with reference to FIG. 1), and aspects of packet segmentation and reassembly for mesh networks can be implemented. Generally, the environment 900 includes the mesh network 100 implemented as part of a smart-home or other type of structure with any number and type of mesh network devices that are configured for communication in a mesh network. For example, the mesh network devices can include a thermostat 902, hazard detectors 904 (e.g., for smoke and/or carbon monoxide), cameras 906 (e.g., indoor and outdoor), lighting units 908 (e.g., indoor and outdoor), and any other types of mesh network devices 910 that are implemented inside and/or outside of a structure 912 (e.g., in a smart-home environment). In this example, the mesh network devices can also include any of the previously described devices, such as a node 102.

In the environment 900, any number of the mesh network devices can be implemented for wireless interconnection to wirelessly communicate and interact with each other. The mesh network devices are modular, intelligent, multi-sensing, network-connected devices, which can integrate seamlessly with each other and/or with a central server or a cloud-computing system to provide any of a variety of useful smart-home objectives and implementations. An example of a mesh network device that can be implemented as any of the devices described herein is shown and described with reference to FIG. 10.

In implementations, the thermostat 902 may include a Nest® Learning Thermostat that detects ambient climate characteristics (e.g., temperature and/or humidity) and controls a HVAC system in the smart-home environment. The learning thermostat 902 and other smart devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 904 can be implemented to detect the presence of a hazardous substance or a substance indicative of a hazardous substance (e.g., smoke, fire, or carbon monoxide). In examples of wireless interconnection, a hazard detector 904 may detect the presence of smoke, indicating a fire in the structure, in which case the hazard detector that first detects the smoke can broadcast a low-power wake-up signal to all of the connected mesh network devices. The other hazard detectors 904 can then receive the broadcast wake-up signal and initiate a high-power state for hazard detection and to receive wireless communications of alert messages. Further, the lighting units 908 can receive the broadcast wake-up signal and activate in the region of the detected hazard to illuminate and identify the problem area. In another example, the lighting units 908 may activate in one illumination color to indicate a problem area or region in the structure, such as for a detected fire or break-in, and activate in a different illumination color to indicate safe regions and/or escape routes out of the structure. In another example, a doorbell or door monitoring system may include LEDs that flash yellow (or other color) when a presence is detected, or flash red if an alarm is activated.

In various configurations, the mesh network devices 910 can include an entryway interface device that functions in coordination with a network-connected door lock system, and that detects and responds to a person's approach to or departure from a location, such as an outer door of the structure 912. The entryway interface device can interact with the other mesh network devices based on whether someone has approached or entered the smart-home environment. An entryway interface device can control doorbell functionality, announce the approach or departure of a person via audio or visual means, and control settings on a security system, such as to activate or deactivate the security system when occupants come and go. The mesh network devices 910 can also include other sensors and detectors, such as to detect ambient lighting conditions, detect room-occupancy states (e.g., with an occupancy sensor), and control a power and/or dim state of one or more lights. In some instances, the sensors and/or detectors may also control a power state or speed of a fan, such as a ceiling fan. Further, the sensors and/or detectors may detect occupancy in a room or enclosure, and control the supply of power to electrical outlets or devices, such as if a room or the structure is unoccupied.

The mesh network devices 910 may also include connected appliances and/or controlled systems, such as refrigerators, stoves and ovens, washers, dryers, air conditioners, pool heaters, irrigation systems, security systems, and so forth, as well as other electronic and computing devices, such as televisions, entertainment systems, computers, intercom systems, garage-door openers, ceiling fans, control panels, and the like. When plugged in, an appliance, device, or system can announce itself to the mesh network as described above, and can be automatically integrated with the controls and devices of the mesh network, such as in the smart-home. It should be noted that the mesh network devices 910 may include devices physically located outside of the structure, but within wireless communication range, such as a device controlling a swimming pool heater or an irrigation system.

The mesh network 100 includes a border router 914 that interfaces for communication with an external network, outside the mesh network 100. The border router 914 connects to an access point 916, which connects to a communication network 918, such as the Internet. A cloud service 920, which is connected via the communication network 918, provides services related to and/or using the devices within the mesh network 100. By way of example, the cloud service 920 can include applications for connecting end user devices, such as smart phones, tablets, and the like, to devices in the mesh network, processing and presenting data acquired in the mesh network 100 to end users, linking devices in one or more mesh networks 100 to user accounts of the cloud service 920, provisioning and updating devices in the mesh network 100, and so forth. For example, a user can control the thermostat 902 and other mesh network devices in the smart-home environment using a network-connected computer or portable device, such as a mobile phone or tablet device. Further, the mesh network devices can communicate information to any central server or cloud-computing system via the border router 914 and the access point 916. The data communications can be carried out using any of a variety of custom or standard wireless protocols (e.g., Wi-Fi, ZigBee for low power, BLE, 6LoW-PAN, etc.) and/or by using any of a variety of custom or standard wired protocols (CAT6 Ethernet, HomePlug, etc.).

Any of the mesh network devices in the mesh network 100 can serve as low-power and communication nodes to create the mesh network 100 in the smart-home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the mesh network. The mesh network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor detects that the room is dark and when the occupancy sensor detects that someone is in the room. Further, the sensor can include a low-power wireless communication chip (e.g., a ZigBee chip, a Bluetooth chip, a BLE chip, and so forth) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment as well as over the Internet to a central server or cloud-computing system.

In other configurations, various ones of the mesh network devices can function as "tripwires" for an alarm system in the smart-home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the mesh network. In other implementations, the mesh network can be used to automatically turn on and off the lighting units 908 as a person transitions from room to room in the structure. For example, the mesh network devices can detect the person's movement through the structure and communicate corresponding messages via the nodes of the mesh network. Using the messages that indicate which rooms are occupied, other mesh network devices that receive the messages can activate and/or deactivate accordingly. As referred to above, the mesh network can also be utilized to provide exit lighting in the event of an emergency, such as by turning on the appropriate lighting units 908 that lead to a safe exit. The light units 908 may also be turned-on to indicate the direction along an exit route that a person should travel to safely exit the structure.

The various mesh network devices may also be implemented to integrate and communicate with wearable computing devices, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other mesh network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the mesh network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the mesh network, conforming to the wireless interconnection protocols for communicating on the mesh network.

The mesh network devices 910 may also include a smart alarm clock for each of the individual occupants of the structure in the smart-home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the mesh network based on a unique signature of the person, which is determined based on data obtained from sensors located in the mesh network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 902 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other mesh network devices can use the data to provide other smart-home objectives, such as adjusting the thermostat 902 so as to pre-heat or cool the environment to a desired setting, and turning-on or turning-off the lights 908.

In implementations, the mesh network devices can also be utilized for sound, vibration, and/or motion sensing such as to detect running water and determine inferences about water usage in a smart-home environment based on algorithms and mapping of the water usage and consumption. This can be used to determine a signature or fingerprint of each water source in the home, and is also referred to as "audio fingerprinting water usage." Similarly, the mesh network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

Figure 10:
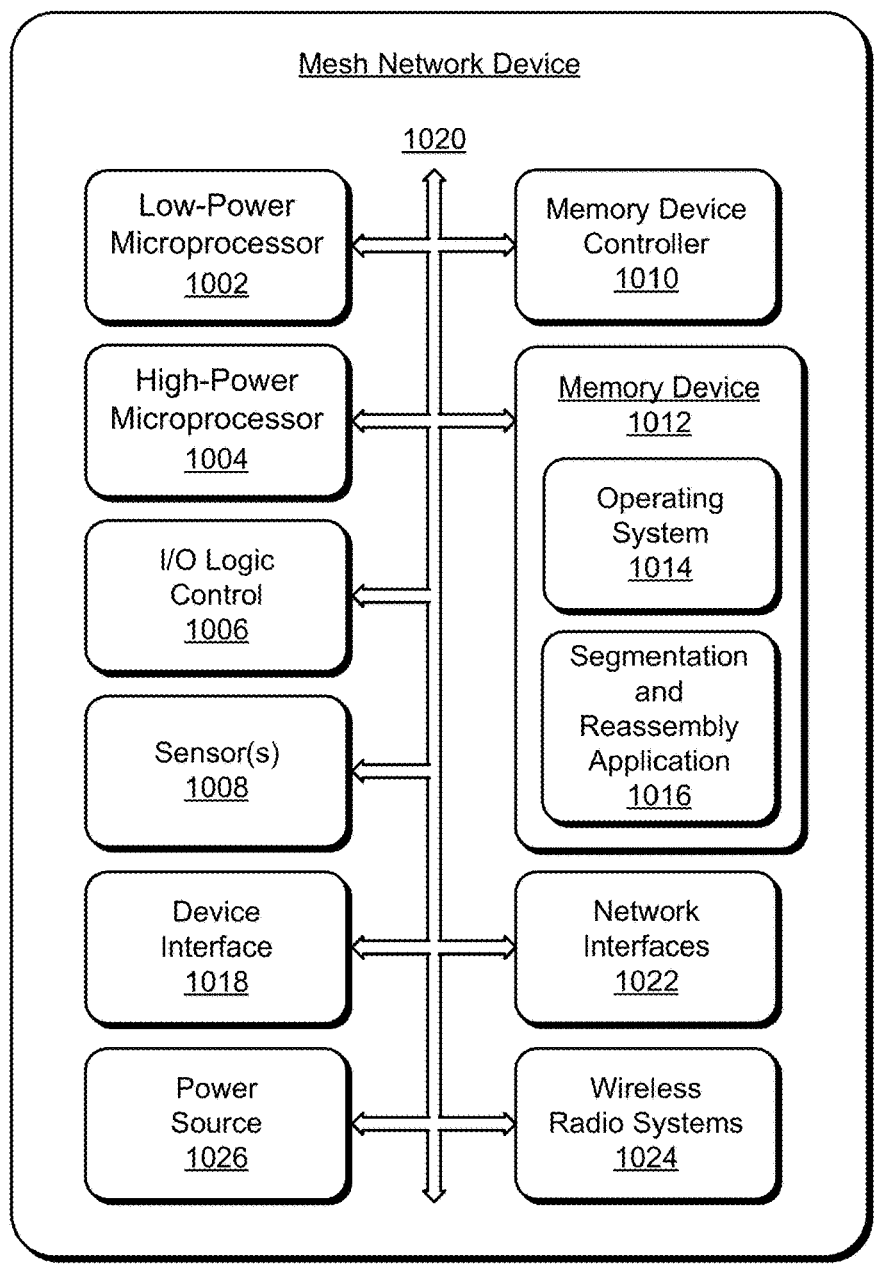
FIG. 10 illustrates an example mesh network device that can be implemented in a mesh network environment in accordance with one or more aspects of the techniques described herein.

FIG. 10 illustrates an example mesh network device 1000 that can be implemented as any of the mesh network devices in a mesh network in accordance with one or more aspects of packet segmentation and reassembly for mesh networks as described herein. The device 1000 can be integrated with electronic circuitry, microprocessors, memory, input output (I/O) logic control, communication interfaces and components, as well as other hardware, firmware, and/or software to implement the device in a mesh network.

In this example, the mesh network device 1000 includes a low-power microprocessor 1002 and a high-power microprocessor 1004 (e.g., microcontrollers or digital signal processors) that process executable instructions. The device also includes an input-output (I/O) logic control 1006 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 1002 and the high-power microprocessor 1004 can also support one or more different device functionalities of the device. For example, the high-power microprocessor 1004 may execute computationally intensive operations, whereas the low-power microprocessor 1002 may manage less complex processes such as detecting a hazard or temperature from one or more sensors 1008. The low-power processor 1002 may also wake or initialize the high-power processor 1004 for computationally intensive processes.

The one or more sensors 1008 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 1008 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the mesh network device 1000 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The mesh network device 1000 includes a memory device controller 1010 and a memory device 1012, such as any type of a nonvolatile memory and/or other suitable electronic data storage device. The mesh network device 1000 can also include various firmware and/or software, such as an operating system 1014 that is maintained as computer executable instructions by the memory and executed by a microprocessor. The device software may also include a segmentation and reassembly application 1016 that implements aspects of packet segmentation and reassembly for mesh networks. The mesh network device 1000 also includes a device interface 1018 to interface with another device or peripheral component, and includes an integrated data bus 1020 that couples the various components of the mesh network device for data communication between the components. The data bus in the mesh network device may also be implemented as any one or a combination of different bus structures and/or bus architectures.

The device interface 1018 may receive input from a user and/or provide information to the user (e.g., as a user interface), and a received input can be used to determine a setting. The device interface 1018 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 1018 may also receive inputs from any number of peripherals, such as buttons, a keypad, a switch, a microphone, and an imager (e.g., a camera device).

The mesh network device 1000 can include network interfaces 1022, such as a mesh network interface for communication with other mesh network devices in a mesh network, and an external network interface for network communication, such as via the Internet. The mesh network device 1000 also includes wireless radio systems 1024 for wireless communication with other mesh network devices via the mesh network interface and for multiple, different wireless communications systems. The wireless radio systems 1024 may include Wi-Fi, Bluetooth™, Mobile Broadband, and/or point-to-point IEEE 802.15.4. Each of the different radio systems can include a radio device, antenna, and chipset that is implemented for a particular wireless communications technology. The mesh network device 1000 also includes a power source 1026, such as a battery and/or to connect the device to line voltage. An AC power source may also be used to charge the battery of the device.

Although aspects of packet segmentation and reassembly for mesh networks have been described in language specific to features and/or methods, the subject of the appended claims is not necessarily limited to the specific features or methods described. Rather, the specific features and methods are disclosed as example implementations of packet segmentation and reassembly for mesh networks, and other equivalent features and methods are intended to be within the scope of the appended claims. Further, various different aspects are described and it is to be appreciated that each described aspect can be implemented independently or in connection with one or more other described aspects.

What is claimed is:

1. A mesh network device implemented as a source node, the mesh network device comprising:
    a Bluetooth mesh network interface configured for communication in a mesh network;
    a memory and processor system to implement an application that is configured to:
        concatenate, at a transport layer, a segment transport header to a first segment of a set of segments to form a transport payload;
        insert a transport payload into a segmented access message, the segmented access message comprising a segment transport header and a segment of a segmented access protocol data unit (PDU), the segment transport header including a segmentation and reassembly transaction identifier (SarTID) field, a segment offset (SegO) field, and a segment total (SegN) field;
        transmit the segmented access message to a destination node, the transmission causing the destination node to initialize an acknowledgment timer after receipt of the segmented access message;
concatenate the segment transport header to additional segments of the set of segments to form additional transport payloads;
insert each of the additional transport payloads into additional segmented access messages;
transmit the additional segmented access messages to the destination node;
in response to the acknowledgment timer expiring at the destination node, receive a segment acknowledgement message including a segment acknowledgement (SegACK) field comprising a bit field indicating which of the first segment and the additional segments of the set of segments were received by the destination node; and
retransmit segmented access messages to the destination node corresponding to the segments that were not received by the destination node.

2. The mesh network device of claim 1, wherein the application is configured to:
receive, at the transport layer, an access protocol data unit (PDU); and
segment the access PDU into the set of segments.

3. The mesh network device of claim 2, wherein the access PDU comprises an application payload and an application message integrity check, and wherein the application message integrity check is usable by the destination node to verify an authenticity of a reassembled application payload.

4. The mesh network device of claim 1, wherein:
the SarTID uniquely identifies the set of the segments;
the SegO indicates the offset for an associated segment from a beginning of the access PDU; and
the SegN indicates a total number of segments that together comprise the access PDU.

5. The mesh network device of claim 1, wherein the segmented access message includes a network message integrity check usable by the destination node to authenticate a network layer message.

6. The mesh network device of claim 1, wherein the segmented access message includes a source address for the source node and a destination address for the destination node.

7. A method of communicating data in a Bluetooth mesh network with size-constrained packets by a destination node, the method comprising:
receiving, by the destination node, a segmented access message comprising a segment transport header and a segment of a segmented access protocol data unit (PDU), the segment transport header including a segmentation and reassembly transaction identifier (SarTID) field, a segment offset (SegO) field, and a segment total (SegN) field;
if the received segmented access message is a first segmented access message received with the Sarin), allocating a segment of memory that is a length indicated by a length value of the SegN field;
initializing an acknowledgment timer after receipt of the segmented access message;
receiving additional segmented access messages; and
responsive to the acknowledgment timer expiring, transmitting a segment acknowledgement message including a segment acknowledgement (SegACK) field comprising a bit field indicating which of the segments included in the segmented access message and additional segmented access messages were received by the destination node.

8. The method of claim 7, further comprising:
storing the received segment in the allocated segment of memory at an offset equal to an offset value indicated by the SegO field.

9. The method of claim 8, the method further comprising:
for each of the additional received segmented access messages, storing each of the one or more received segments in the allocated segment of memory at the offset equal to the offset value indicated by the SegO field in each of the additional segmented access messages.

10. The method of claim 9, the method further comprising transmitting another segment acknowledgement message with the SegACK field indicating that the one or more segmented access messages were received by the destination node after the reception of the additional segmented access messages.

11. The method of claim 9, wherein each segmented access message includes a network message integrity check, the method further comprising:
validating each segmented access message using the network message integrity check.

12. The method of claim 7, wherein:
the SarTID uniquely identifies the set of the segments;
the SegO indicates the offset for an associated segment from a beginning of the access PDU; and
the SegN indicates a total number of segments that together comprise the access PDU.

13. The method of claim 7, wherein the segmented access message includes a source address for a source node and a destination address for the destination node.

14. A system comprising:
a Bluetooth mesh network;
a destination mesh network device; and
a source mesh network device configured to:
concatenate, at a transport layer, a segment transport header to a first segment of a set of segments to form a transport payload;
insert the transport payload into a segmented access message, the segmented access message comprising a segment transport header and a segment of a segmented access protocol data unit (PDU), the segment transport header including a segmentation and reassembly transaction identifier (SarTID) field, a segment offset (SegO) field, and a segment total (SegN) field;
transmit the segmented access message, via the Bluetooth mesh network, to the destination mesh network device;
the destination mesh network device configured to:
initialize an acknowledgment timer after receipt of the segmented access message;
the source mesh network device configured to:
concatenate the segment transport header to additional segments of the set of segments to form additional transport payloads;
insert each of the additional transport payloads into additional segmented access messages;
transmit the additional segmented access messages to the destination mesh network device;
the destination mesh network device configured to:
responsive to the acknowledgment timer expiring, transmit the segment acknowledgement message comprising the segment acknowledgement (SegACK) field, the SegACK field comprising a bit field indicating which of the segments included in the segmented access message and additional segmented access messages were received by the destination mesh network device;

the source mesh network device configured to:

receive, via the Bluetooth mesh network, the segment acknowledgement message from the destination mesh network device for at least some of the additional segments; and retransmit one or more of the additional segmented access messages to the destination mesh network device corresponding to the additional segments that were not received by the destination mesh network device.

15. The system of claim 14, the source mesh network device configured to:

receive, at a transport layer, an access protocol data unit (PDU); and segment the access PDU into the set of segments.

16. The system of claim 14, the destination mesh network device configured to:

if the received segmented access message is the first segmented access message received with the SarTID, allocate a segment of memory that is a length indicated by a length value of the SegN field; and transmit, to the source mesh network device, a segment acknowledgement message including a segment acknowledgement (SegACK) field indicating that the segmented access message was received by the destination mesh network device.

17. The system of claim 16, the destination mesh network device configured to:

store the received segment in the allocated segment of memory at an offset equal to an offset value indicated by the SegO field.

18. The system of claim 16, wherein:

the SarTID uniquely identifies the set of the segments;

the SegO indicates the offset for an associated segment from a beginning of the access PDU; and the SegN indicates a total number of segments that together comprise the access PDU.

* * * * *

UNITED STATES PATENT AND TRADEMARK OFFICE
CERTIFICATE OF CORRECTION

| | | |
|---|---|---|
| PATENT NO. | : 10,849,016 B2 | |
| APPLICATION NO. | : 16/423795 | |
| DATED | : November 24, 2020 | |
| INVENTOR(S) | : Martin A. Turon | |

It is certified that error appears in the above-identified patent and that said Letters Patent is hereby corrected as shown below:

In the Claims

Column 17, Lines 55-56, Claim 7 after "the" before "allocating" delete "Sarin" enter --SarTID--

Signed and Sealed this
Twelfth Day of January, 2021

Andrei Iancu
*Director of the United States Patent and Trademark Office*